United States Patent [19]  [11] 3,983,531
Corrigan  [45] Sept. 28, 1976

[54] VEHICLE-RESPONSIVE SIGNAL MEANS
[75] Inventor: Thomas B. Corrigan, Prince George, Canada
[73] Assignee: Northern Traffic & Signal Systems Ltd., Prince George, Canada
[22] Filed: Nov. 6, 1975
[21] Appl. No.: 629,296

Related U.S. Application Data
[63] Continuation-in-part of Ser. No. 477,656, June 10, 1974, abandoned.

[52] U.S. Cl. .............................. 340/31 R; 340/38 L; 317/139
[51] Int. Cl.² ......................................... G08G 1/00
[58] Field of Search ........................ 340/31 R, 38 L

[56] References Cited
UNITED STATES PATENTS
3,054,087 9/1962 Clegg ................................. 340/31 R Primary Examiner—Thomas B. Habecker

[57] ABSTRACT

A roadside, overspeed signal indicator is operated by a moving vehicle. Two vehicle-responsive, detectors are spaced in the direction of travel of the vehicle in a traffic lane and are preferably loop detectors embedded in the traffic lane. An adjustable first timer is in an electrical circuit responsive to the first detector and this electrical circuit, once energized, becomes and remains non-responsive to the first detector until the first timer times out. A signal, electrical circuit is responsive to the second detector if it is energized before the first timer times out. This signal, electrical circuit includes a second timer, so its length of operation in response to a signal from the second detector can be predetermined regardless of the time length of such signal. A counter is provided for counting the number of vehicles operating the first timer and another counter is provided for counting the number of operations of the signal indicator. Also, circuitry is provided to determine the nature of the signal indicator, such as a pulsing, illuminated, gas tube and an audible signal.

6 Claims, 4 Drawing Figures

VEHICLE-RESPONSIVE SIGNAL MEANS

This application is a continuation-in-part of my co-pending application, Ser. No. 477,656 filed June 10, 1974, and now abandoned.

BACKGROUND OF THE INVENTION

The prior art programs of enforcing speed laws for motor vehicles relied primarily on police manned vehicles, such as marked automobiles and motorcycles with a varied use of unmarked vehicles—the amount of use being a judgment decision; mobile and fixed radar equipment; and the use of civilian spotters. For those caught from the foregoing, the courts have fixed penalties, in various degrees of severity, to act as punishments for violaters and examples for those who might be tempted to violate. Also, the results of the Court decisions were given various degrees of publicity to further act as a deterrent to others.

Despite such prior attempts to eliminate speeding of motor vehicles, the number of violations seems or actually does increase rather than decrease.

Attempts have been made to use mechanical devices to monitor traffic and visually and/or audibly indicate violations. However, the lack of certainty and accuracy of such devices has resulted in the lack of, or substantially no use of, such devices on a general scale. A device announcing and visually indicating to the public that a certain vehicle is being operated in a manner so that the driver is guilty of a speeding violation must be positively accurate for the offender to favorably react and blame himself or herself rather than the mechanical device, which may or may not be accurate. Also, third parties will not properly cooperate to eliminate speeders if they are not positive that the warning devices are free of all possible errors. The old adage that an inaccurate scale is no scale at all can be properly paraphrased to define mechanical devices to indicate the excess speed rate of passing vehicles.

Prior U.S. Letters Pat. Nos. illustrating mechanical devices attempting to regulate vehicular traffic are: 2,325,435; 2,874,367; 2,911,635; 3,054,087; and 3,544,958.

SUMMARY OF THE INVENTION

The present invention is an improvement in audio and visual indicators positioned adjacent roadways, operated by a passing vehicle on said roadway, and indicating illegal speeding of the vehicle with positive accuracy, and to an extent that the motorist directly involved is accurately identified as a speeder for his benefit and for the benefit of others. Such accuracy is essential to provide the desired cooperative reaction, not only of the speeder but of pedestrians and other motorists who may be witnesses, some of whom, if they are certain of a violation occurring, will cooperate with the legal authorities and against a positively known offender. A device not having positive accuracy or one capable of malfunctioning because of other vehicles on the roadway has no value.

The construction involves first and second vehicle-responsive detector means, preferably in the form of loop detectors embedded in a lane of a roadway, and spaced apart, in the direction of travel of vehicles in said lane, a precise measured distance. A first electrical circuit is energized by the presence of a traveling vehicle relative to the first vehicle-responsive detector means and includes a first, electrically operated, vehicle timer means. Once the first circuit is energized, neither it nor the first detector means are responsive to any subsequent vehicle or any other means until the first timer means runs its cycle and times out. The first timer means is adjustable to provide for a time period during which a vehicle may travel a predetermined space between the first and second detector means, which allows the device to be set to audibly and visually indicate speeds over a preselected legal speed. The second vehicle-responsive detector is used to trigger another electrical circuit to operate electrically responsive overspeed visual and/or audio indicating means. This other electrical circuit includes therein electrical switch means which are closed only during the operation of the first timer means. Thus, if a vehicle travels over the traffic lane involved and operates the first detector means, which in turn energizes the first electrical circuit and energizes the first timer means, and then before the first timer times out, operates the second detector means, such vehicle will cause the audio and/or visual overspeed indicating means to operate. However, if said vehicle operates the second detector means after the first timer means times out, then such vehicle (because of the time which it took to travel the measured distance) will not be guilty of overspeeding and will not operate said overspeed indicating means. The electrical circuit to said overspeed indicating means includes therein an additional timer means. This additional timer means is adjustable so that the overspeed indicating means will operate for a predetermined time period (regardless of the length of time of reacting the second detector means during the time cycle of the first timer means) to provide for a desired time duration of the overspeed impulse.

The electrical circuit, which may be operated by the presence of a vehicle in operative relation to the first detector means, includes three electrical switches disposed in series relation—the first thereof being a normally open switch, and the second thereof being a normally closed switch (the latter with a time delay) and which first and second switches are responsive to the action of the first detector means. These first two switches cooperate with a first timer means to prevent a second or trailing vehicle from operating the system until the first timer means times out after being operated by a first vehicle. The third switch means is normally closed and its opening is responsive to a vehicle reacting the second detector means. By reason of this, a trailing vehicle cannot operate the first timer means until the first vehicle has completed its operation and until the first vehicle no longer operates the second detector means.

Other features of my invention will become explicit or implicit as the description of my invention proceeds in connection with the drawings, wherein like reference numerals refer to like parts and wherein:

THE DRAWINGS

DESCRIPTION

Figure 1:
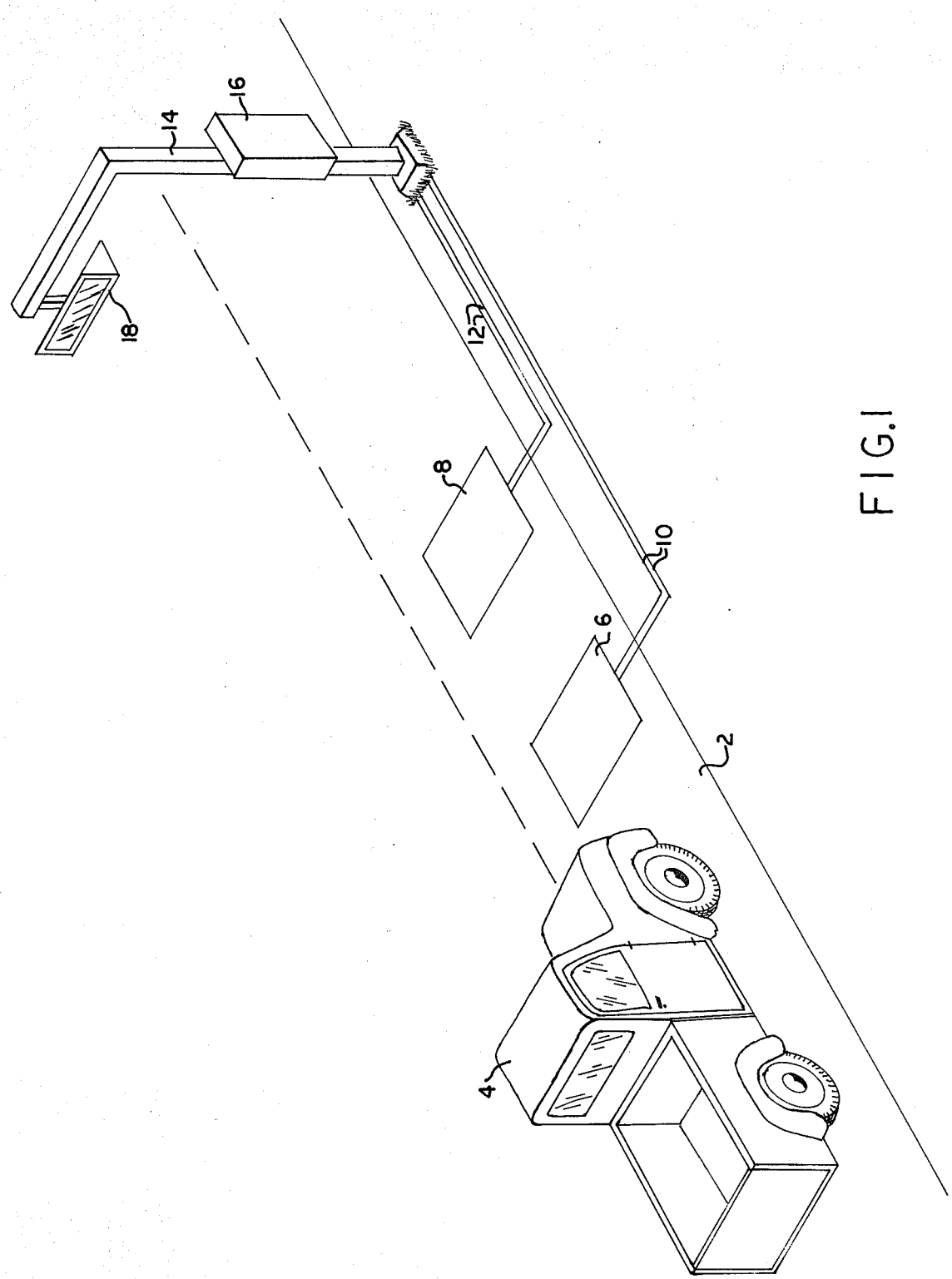
FIG. 1 is a somewhat schematic and perspective view of this invention applied to a lane of a roadway.

Referring to FIG. 1 of the drawings, the invention is somewhat schematically illustrated. One lane of a multilane highway is illustrated by roadway 2; and a pickup truck is illustrated as the motor vehicle 4 traveling on said roadway 2 and in the direction toward the right of said roadway. First and second loop detectors 6 and 8 are located below the surface of the roadway 2 and are spaced apart in the direction of travel of vehicle 4 on said roadway 2. Loop detectors are well known in the art and are commonly used today to energize electrical switch means to control various traffic signals, such as go, stop, left turn, right turn, and to count the number of passing vehicles. The loop detectors include a loop positioned below the surface of the road and also include turned electronic circuits (not shown) which circuits are altered by the presence of a large mass of ferral magnetic material—a material which is present in substantial quantities in motor vehicles. For a particular vehicle, the first loop detector 6 will react in the same spacedrelation to it as the second loop detector 8 will react to the same vehicle. The loop detectors 6 and 8 are identical and are alined on roadway 2, have such dimensions as 4' in the direction of travel on roadway 2 and 6' crosswise, and have their centers spaced apart in the direction of travel of the vehicles a predetermined distance, such as 7'. Thus, a given vehicle will travel a predetermined distance, such as 7', to cause a reaction of the second loop detector after it has previously caused the reaction of the first loop detector 6. Also, the time lapse for a given traveling vehicle to cause a reaction of loop detector 8 after having first caused the reaction to loop detector 6 represents the time interval consumed for that given vehicle to travel the predetermined distance of say, 7'. The device of this invention is sufficiently precise and accurate so that short distances, such as 7', can be employed and such short distances will have the physical characteristics of preventing a succeeding vehicle from passing a vehicle under test and moving in front of and ahead of the test vehicle in a given lane and thus interfere with the checking of the vehicle under test.

The signal from the first loop detector 6 is conveyed by suitable conductors 10 (illustrated by underground wires) and the signal from second loop detector 8 is again conveyed by underground conductors, as conductors 12. Conductors 10 and 12 are shown schematically in FIG. 1 and in the electrical circuitry of FIG. 2. A standard 14 may be used to support an electrical cabinet 16 and also an overhead visual signal 18. The cabinet 16 will function as a housing for electrical equipment shown in FIGS. 2, 3, and 4.

Figure 2:
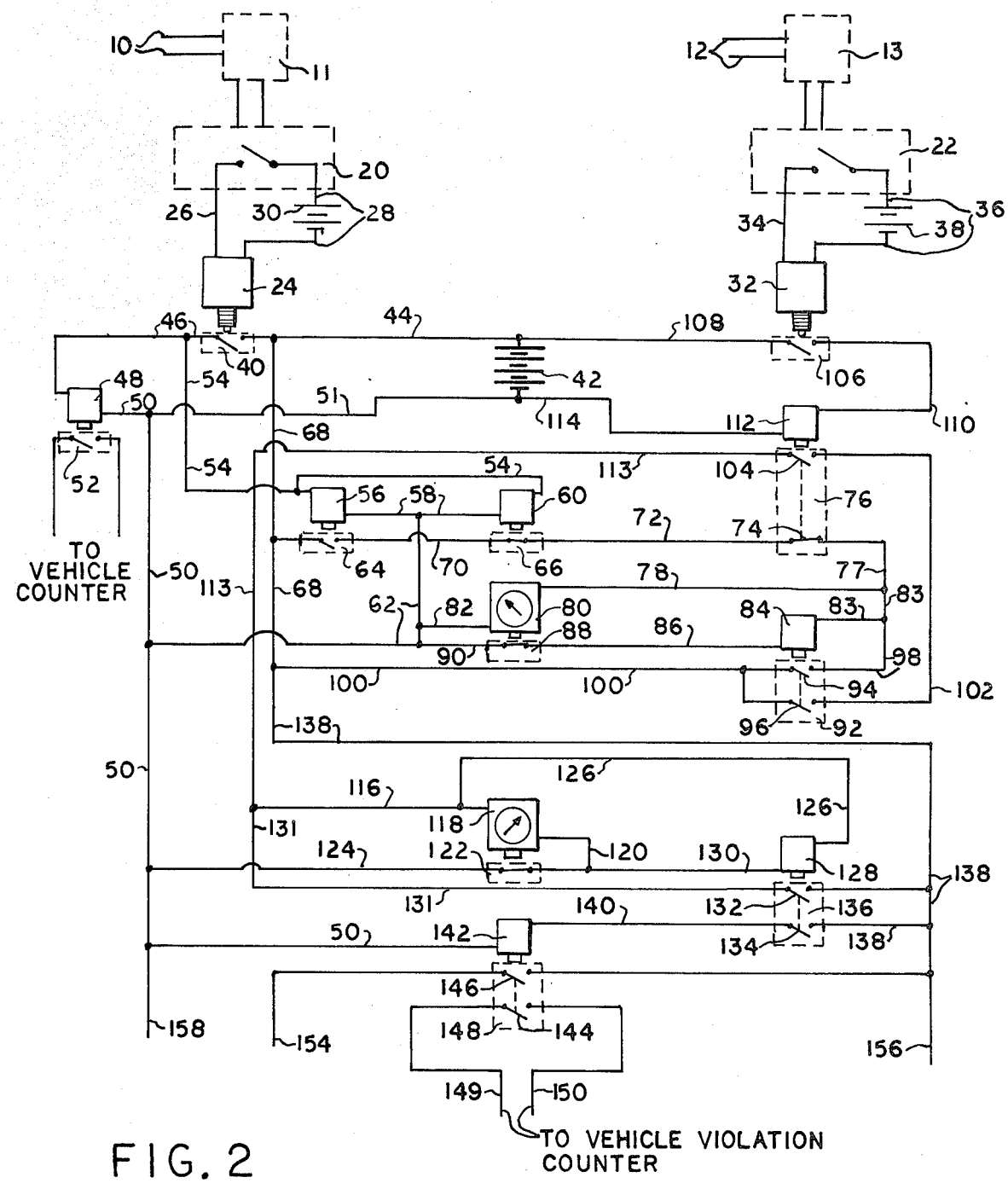
FIG. 2 is a wiring diagram, with parts shown somewhat schematically, showing the major portions of the electrical circuits.

Referring now to FIG. 2 of the drawings, an impulse on conductors 10 (responsive to the presence of a vehicle in a predetermined relation to the first loop detector 6) causes a reaction through a tuned electronic circuit, illustrated by box diagram 11, to close normally open switch 20 and an impulse on conductors 12 (responsive to the presence of such a vehicle in predetermined relation to the second loop detector 8) similarly causes through a similar circuit, represented by box diagram 13, normally open switch 22 to close. As the functions of standard loop detectors to close normally open switches because of the presence of ferral magnetic material is well known in the art, the electrical wiring is not shown or described and only the schematic reference is made, in the interest of brevity.

Thus, whenever loop detector 6 is reacting to the presence of a vehicle 4, switch means 20 is closed and whenever loop detector 8 is reacting to the presence of said vehicle 4, then switch means 22 is closed.

Switch means 20 connects the field coil of relay 24 through conductors 26 and 28, with power source 30, illustrated by a battery. Switch means 22 connects the field coil of relay 32, through conductors 34 and 36, with power source 38, again illustrated by a battery. As batteries are indicated as a power source, in connection with various circuitry herein, energy from the positive and negative poles of such batteries will be referred to, for purposes of convenience and not as a limitation, as plus or positive energy from one pole and negative or ground energy from the other pole.

The start of any given cycle will be when relay 24 is energized because of the reactance of loop detector 6 and under the assumed condition that relay 32 is deenergized. Under such circumstances, additional circuitry is energized. First detector-responsive switch means 40 is closed by energizing of relay 24, thus establishing: from the plus of energy source 42, along conductor 44, through then closed first detector-responsive switch 40, along conductor 46, through the field coil of relay 48, and along conductors 50 and 51 to the negative of energy source 42, thus closing switch means 52 of relay 48. Switch means 52 is connected with any suitable impulse counter and the number of impulses counted will represent the number of vehicles causing a reaction to loop detector 6 under the assumed conditions—thus, the notation on the drawings of "TO VEHICLE COUNTER."

At the same time that the field coil of relay 48 is energized, another electrical circuit is completed. Plus energy along conductor 46 (now energized) passes along conductor 54, through the field coil of relay of third, electrically operable, switch means 56 to conductor 58. At the same time energy from conductor 54 passes through the field coil of relay of second, electrically operable, switch means 60 to conductor 58. Energy on conductor 58 passes along conductors 62, 50, and 51 to the negative of power source 42. This energizes switches 56 and 60 and closes (normally open) switch blade means 64 of switch 56 and after a time delay, opens (normally closed switch blade means 66 of switch 60. Switch blade means 64 of switch 56 is of the type that is instantly responsive or in other words, closes substantially immediately upon energizing of third switch 56 while switch blade means 66 reacts (with its preset time delay) upon energizing of second switch 60. The time delay in opening switch blade means 66 after the energizing of relay of its second switch 60 is in the order of miliseconds and a delay of 1 to 2 miliseconds is sufficient for the purposes here involved. Switch blade means 64 is normally open and is closed upon energizing of third switch 56, while switch blade means 66 is normally closed and is opened after a time delay upon energizing of its second switch 60. While switch blades 64 and 66 are both closed, the following first electrical circuit is established: from the plus energy on conductor 44, along conductor 68, through now closed switch blade means 64, along conductor 70, along normally closed (and not yet opened) switch blade means 66, along conductor 72, through normally closed (assumed closed for reasons later stated) switch blade means 74 of switch means 76, along conductors 77 and 78, through first, vehicle timer means 80, along conductor 82 to conductors 62, 50, and 51, to the negative of power source 42. Thus energizing first, vehicle timer means 80.

In the last mentioned circuit, it was assumed that switch blade means 74, of switch means 76, was in its normally closed position. Switch blade means 74 is only open when second loop detector 8 has reacted to the presence of a vehicle 4, resulting in the energizing of relay 32 and the consequent opening of normally closed switch blade means 74, which will be later explained. Thus, under the assumed condition of reaction of first loop detector 6 but none of second loop detector 8, the said switch blade 74 is in the closed position as indicated. Also, the first timer means 80 has an operative coil between conductors 78 and 82 and the energizing of this coil starts the timer mechanism and the same runs for a predetermined adjusted amount of time and after the expiration of such time, the timer mechanism momentarily opens normally closed switch means 88. The energizing of such timer means 80 does not cause the opening of said switch means 88.

When conductor 77 is energized with plus energy from power source 42 (as just described), such energy also flows along conductor 83, through the field coil of first electrical relay 84, along conductor 86, through then closed first timer switch blade means 88 (closed as first timer means 80 has not timed out at the time assumed), along conductor 90, and along conductors 62, 50 and 51 to the negative of power source 42. This energizes the field coil of relay 84 and closes both switch blade means 94 and 96 of switch means 92. Upon the closing of switch blade means 94, a holding circuit is established for relay 84 and first timer means 80 so that after the establishment of said holding circuit, the circuit will remain energized and de-energize only upon the opening of the switch means 88 of the first timer means 80 and this after the elapse of the predetermined set time of the time cycle of the first timer means 80. This holding circuit commences with positive energy on conductor 44 from energy source 42, along conductors 68 and 100, through now closed switch blade means 94, along conductor 98, through the field coil of first electrical relay 84, along conductor 86, through now closed switch 88 of first timer means 80, along conductors 90, 62, 50 and 51, to the negative of power source 42. Also, plus energy on conductor 98 flows along conductors 83 and 78 and through first timer 80 and along conductors 82, 62, 50 and 51 to negative of power source 42.

A primary consideration of the present invention is important at this particular place in the description. The timer 80 is preset so that a vehicle traveling at the legal rate of speed, or thereunder, will not cause a reaction to the second loop detector 8 until after the lapse of the time period for which the timer 80 has been preset. If a vehicle does not cause a reaction of the second loop detector 8 until after the timer 80 has timed out, then we have no speed violation but if the vehicle does cause a reaction to the second loop detector 8 before the timer 80 has timed out, then we have an overspeed violation. For example, if the speed limit on a roadway 2 is 30 miles an hour and the space between centers or the reaction distances between loop detectors 6 and 8 to any vehicle is 7', then the timer 80 is set for a period such as 139 miliseconds. If the speed limit is 40 or 50 mph, or some other speed, then the timer 80 will be set for a corresponding minimum time period for a vehicle to travel 7' and still stay under the legal speed limit in so doing. In other words, if a vehicle gets to and reacts the second loop detector 8 before the predetermined time limit set for the timer 80, such vehicle is guilty of unlawful speeding and if the vehicle reaches and reacts said second loop detector 8 at a time beyond the setting of the timer 80, then such vehicle is not exceeding the legal speed limit.

With the energizing of first electrical relay 84, the second switch blade means 96 of switch means 92 is also closed. Thus, we have an additional possible circuit: Plus energy on conductor 100 also flows through now closed switch blade means 96, along conductor 102, to now open switch blade means 104 of switch means 76. Switch blade means 104 is now in open position as it was assumed that a vehicle had reacted first loop detector 6 but had not yet reacted second loop detector 8. If the vehicle which reacted first loop detector 6 now reacts second loop detector 8, this will not de-energize first timer means 80 nor first relay 84 (as previously stated, only the opening of switch blade 88 because first timer means 80 times out will open the circuit). Also, a following vehicle cannot trigger a new cycle as the first timer means 80 is now only controlled by its switch blade means 88 which will only open when the first timer means 80 times out. Also, a second timer 118 can only be operated by vehicle 4 reacting second loop detector means 8 while first timer means 80 is in its time cycle (as will be next explained) and thus operation of first timer means 80 and second timer means 118 by two different vehicles is not possible.

If the vehicle, which reacted first loop detector 6, now moves and (also additionally) reacts second loop detector 8, this will cause a switch means 22 to close and relay 32 will be energized from power source 38 through conductors 34 and 36. Energizing of relay 32 will close second detector-responsive, switch blade means 106. Upon such closing, relay 112 will be energized from power source 42 along conductors 108, 110 and 114 through now closed second detector-responsive switch means 106. Upon the energizing of relay 112, the switch blade means 104 of switch means 76 will move from its normally open position to its closed position and switch blade means 74 will move to open position. The opening of switch blade means 74 prevents a subsequent vehicle from triggering a new cycle through switch blades 64, 66 and 74 and, likewise, the presence of a first vehicle, while triggering first trigger means 6, prevents a subsequent vehicle from triggering a new cycle as such first vehicle in such position will cause switch blade means 66 to move to open position.

With switch blade means 96 in closed position and under the circumstances now assumed, the following electric circuit is established: From plus energy of source 42, along conductors 44, 68, and 100, through now closed switch blade 96, along conductor 102, through now closed switch blade means 104, along conductors 113 and 116, through the field coil of second constant impulse providing timer means 118, along conductor 120, through normally closed switch blade means 122 of second timer means 118, and along conductors 124, 50, and 51 to the negative source of power 42.

Thus, to energize second timer means 118, switch blade 96 of switch means 92 must be closed resulting from energizing of first, vehicle timer means 80 and relay 84. Also, second loop detector 8 must be reacted, resulting in the energizing of relay means 112 and the closing of switch blade means 104. Relay 128 is energized with and remains energized with second timer 118 because of conductor 126 (connected to conductor 116) and conductor 130 (connected to conductor 120).

After the second constant impulse providing timer means 118 and second electrical relay 128 are once energized, a holding circuit continuing such energizing is: Conductors 44, 68, and 138, switch blade means 132 of switch means 136 (now closed as second electrical relay 128 is energized), conductors 131, 116, second timer means 118, conductor 120, now closed switch blade means 122 of second timer 118, and conductors 124, 50, and 51 to the negative of power source 42. The only electrical switch blades in the holding circuit of second timer means 118 and second electrical relay 128 are thus switch blade means 132 and switch blade means 122. Until second timer means 118 times out, switch blade means 122 will be closed and also relay 128 will be energized, and thus maintaining switch blades 132 and 134 of switch means 136 in closed position. Second timer means 118 is employed to remain normally closed and momentarily to open after its present time period has elapsed. A cycle of second timer 118 and relay 128 is started by energizing conductors 116 and 120.

Second timer 118 is similar in construction to first timer 80. It is set for a predetermined time cycle and when it times out, it momentarily opens its normally closed switch 122. Energizing of its conductors 116 and 120 starts its time cycle and when it times out, it momentarily opens its switch blade 122 and second electrical relay 128 is de-energized and the holding circuit for second timer 118 and relay 128 is opened and switch blades 132 and 134 of switch 136 move to their normal open positions. Timer 118 has nothing to do with the timing of the presence of a vehicle in a measured distance to determine whether the vehicle is speeding or not speeding. However, from the circuitry and without second timer 118, it would be possible to obtain an impulse of very short duration indicating a violation. Such a very short duration signal might not be a usable signal for the purposes intended as will later appear. At this point, it is desired to indicate the lack of any relation of the second timer 118 to determining the speed of a vehicle 4.

The holding circuit established upon the energizing of second timer 118 and relay 128 is maintained for the preset time of second timer 118 and will provide a circuit duration of desired length to operate warning signals, such as flashing lights, and/or audible signals indicating that a speeding violation has occurred.

With the energizing of relay 128, another, normally open switch blade 134 of switch 136 is closed. The circuit established is: plus power source 42; conductors 44, 68, and 138; now closed switch blade 134 of switch means 136; conductor 140; relay 142; and conductors 50 and 51 to negative power source 42. This energizes relay 142 for the time cycle set for second timer 118. Energizing of relay 142 closes normally open switch blades 144 and 146 of switch means 148. Switch blade means 144 and conductors 149 and 150 are in a circuit of a counter mechanism for counting the number of operations of relay 142 which means the number of speeding or law violations. The counter mechanism may be any conventional electrically controlled counter mechanism responsive to an electric switch, as switch 144, and thus such mechanism is not illustrated but is indicated by the notation "TO VEHICLE VIOLATION COUNTER" from conductors 149 and 150.

Figure 3:
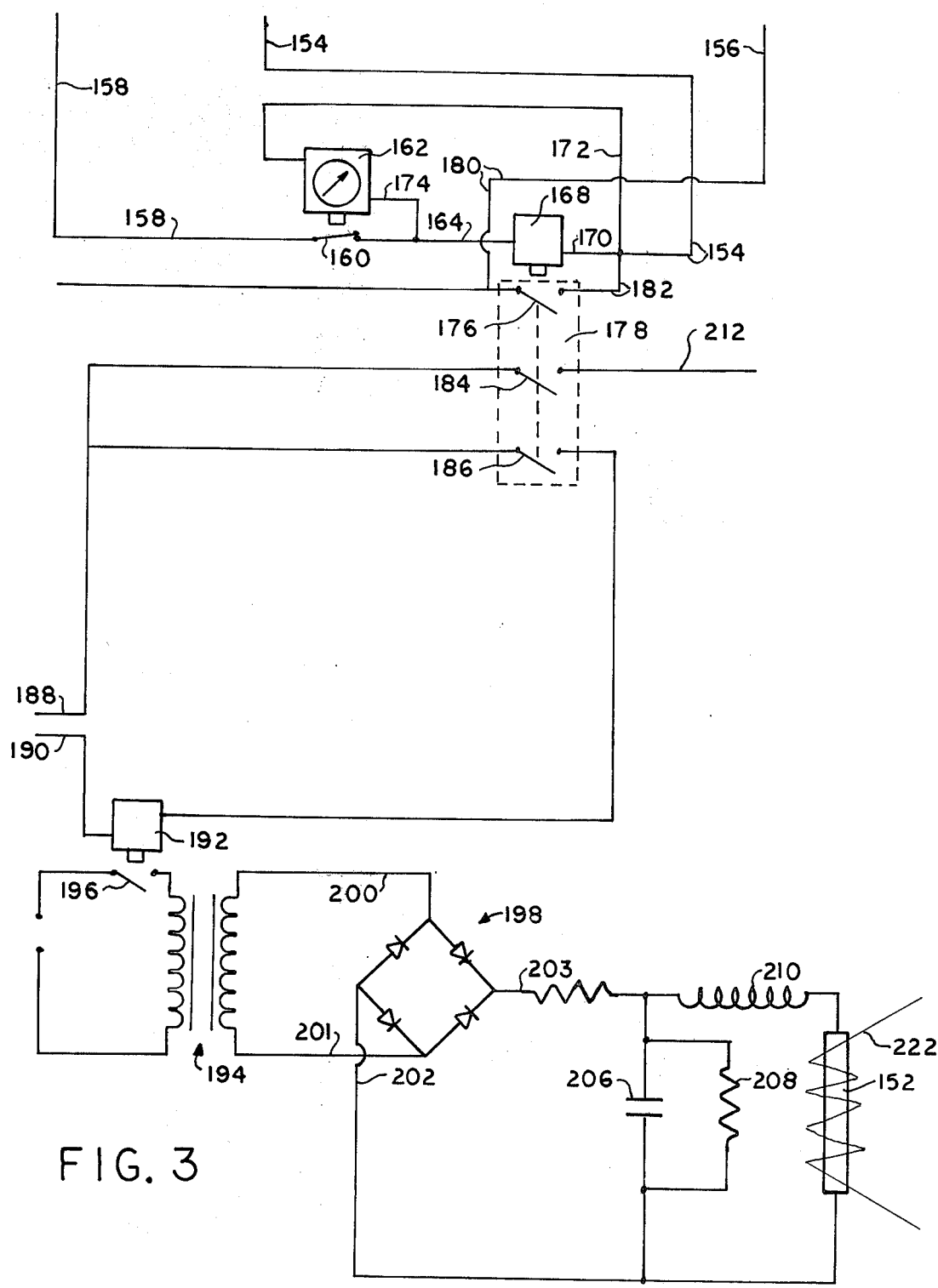
FIGS. 3 and 4 are wiring diagrams, utilizing the electrical signal of FIG. 1, in connection with providing a flashing xenon gas tube light, which is somewhat schematically illustrated.

Now referring to FIG. 2 of the drawings, a second switch blade means 146 of switch means 148 is in the circuitry of a flashing light means which is readily visible on the roadway 2 of FIG. 1 and the lamp 152 is illustrated as a xenon gas tube lamp 152 in FIG. 3 and illustrated in FIG. 1 as overhead visual signal 18 carried by standard 14. While other types of flashing lights may be used and energized for the preset time period of a timer means (later described), a flashing xenon tube is most satisfactory. Also, a suitable audio device (not shown) is preferably connected with, and is energized upon, the energizing of conductor 154 relative to conductor 158. The audio device is not further described or illustrated as the same may be, obviously, conventional.

A circuitry for causing the flashing of said lamp 152 and determining the period thereof comprises conductors 154, 156, and 158, which are shown as broken away in FIG. 2 and are continued thereafter in FIG. 3. Conductors 156 and 158 are connected, respectively, to the plus and minus voltages of a source 44 on FIG. 2. Conductor 154 is connected to the positive voltage of conductor 156 at all times when relay 142 and second timer 118 are energized and for the preset time period of said second timer 118. With the energizing of conductor 154, a circuit is established from plus energy on conductor 156 (always alive), through now closed switch blade 146, conductor 154, (now FIG. 3) conductor 170, through the field winding of relay 168, along conductor 164, through the normally closed switch blade 160 of third signal duration timer 162, and to conductor 158 (always alive). At the same time, energy on conductor 170 flows along conductor 172, through the field coil of third, signal duration time 162, and conductor 174 to conductor 164. Thus, both third timer 162 and relay 168 are energized on energizing of conductor 154. A holding circuit is established for the third timer 162 and relay 168, as energizing of the relay 168 closes (normally open) switch blade 176 of switch means 178. With the closing of switch blade 176, plus energy from conductor 156 (always alive), along conductor 180, now closed switch blade 176, conductors 182 and 170, relay 168, conductor 164, switch 160 of third timer 162, and to conductor 158 (always alive). This holding circuit is maintained until third timer 162 times out and momentarily opens its switch 160. Third timer 162 is preset for the time period it is desired to have lamp 152 operate, once it is started.

Also, when relay 168 is energized, all three switch blades 176, 184, and 186 of switch means 178 move from their normal open positions to their closed positions. When switch blade 186 is closed, the circuitry shown in the lower portion of FIG. 3 of the drawings is energized and when switch 184 is closed, then the circuitry shown in FIG. 4 of the drawings is energized. Obviously, both are energized at the same time but the circuitry of the two figures will be described separately and in connection with the respective figures.

Figure 4:
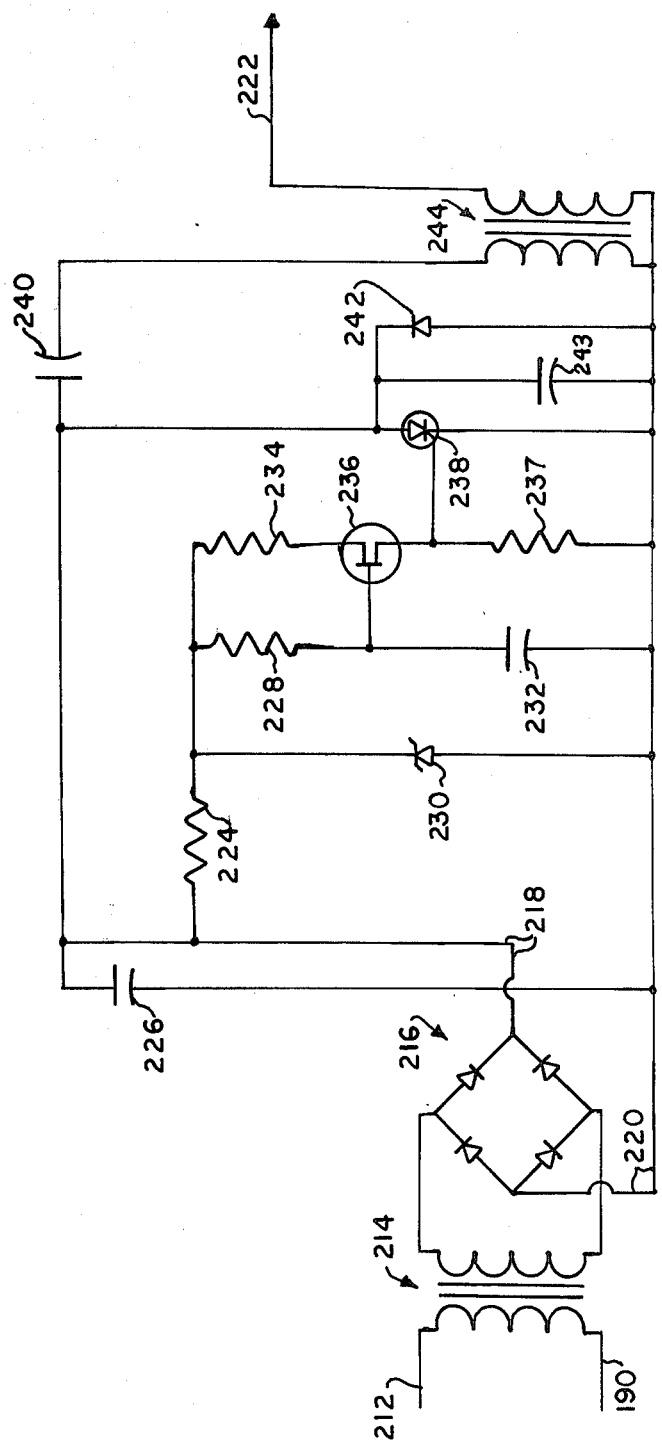

Referring to FIG. 3, conductors 188 and 190 represent a source of electrical energy which is illustrated as 110 volts ac — ac employed as a transformer is used in FIG. 4.

Upon the closing of switch 186, relay 192 is energized by energy from conductors 188 and 190. Upon the energizing of relay 192, its switch 196 is closed to energize the primary of a transformer 194 from a suitable source of alternating current, such as 110 volts ac as illustrated. The secondary of transformer 194 has two output conductors 200 and 201 having the desired voltage therebetween, such as 1400. These conductors 200 and 201 connect with the rectifier 198 to provide a dc output between conductors 202 and 203. The dc output between conductors 202 and 203 is shown somewhat diagrammatically in FIG. 3 as providing the operating voltage for a xenon tube 152 and the parts illustrated will include condenser 206 which is charged and upon discharge fires lamp 152. The choke 210 limits current to the lamp 152. The resistor 208 is used to discharge the condenser 206 between times it fires the lamp 152.

In order to provide for a flashing xenon lamp 152, as distinguished from merely illuminating one, I provide the construction illustrated in FIG. 4 of the drawings. Here the conductor 212, which is energized with alternating current from source conductor 188 when switch blade 184 is closed, and source conductor 190, as shown in FIG. 3, are used to energize the primary of transformer 214. The source conductor 190 to the primary of said transformer 214 is also shown in FIG. 4 of the drawings and is the other conductor, with source conductor 188, of a source of 110 volts ac (as best indicated in FIG. 3). Thus, upon the closing of switch blade 184 (FIG. 3), the transformer 214 (FIG. 4) is energized and the secondary of the transformer 214 agains provides a source of high voltage ac to be delivered to the rectifier 216 to provide high voltage dc between conductors 218 and 220. The voltage between such conductors should be in the order of 1400. The circuitry illustrated in FIG. 4 of the drawings is for the purpose of triggering or causing the xenon lamp 152 to flash intermittently as distinguished from a non-flashing lighting. The circuitry in FIGS. 3 and 4 which cause the xenon lamp 152 to intermittently flash and for a time period determined by the third, signal duration timer 162 are conventional and are illustrated for a more complete showing of the invention but are only in general described as the schematic drawing will be sufficient for one skilled in the art to provide one way of operating a flashing lamp from a signal of timed duration provided by the third, signal duration timer 162. Continuing in connection with FIG. 4 of the drawings, the various circuits shown will convert the 1400 volts dc between conductors 218 and 220 into a pulsating current discharging from high voltabe wire 222, wrapped around the tube of xenon lamp 152, and functioning as a trigger to intermittently fire or light said lamp. The lighting of said lamp will be intermittent and will pulse concurrently with the pulses of the electrical impulses delivered from high voltage wire 222. Also, the values of the various electrical means shown in FIG. 3, in connection with transformer 194 and the output therefrom as delivered to the xenon tube 152, are not sufficient to cause said lamp to light. They are of sufficient value so that when a pulse of high voltage energy is delivered by high voltage wire 222 to the tube of lamp 152, the same lamp will pulsingly light with the pulsating electrical impulse on said wire 222.

The voltage value of the discharge from wire 222 may be in the order of 20,000 volts. As the circuitry is conventional to pulsingly fire a xenon lamp or tube, the circuitry will only be illustrated and the parts generally listed which comprise: condenser 226; resistor 224; resistor 228; xenar diode 230; condenser 232; resistor 234; unijunction 236; resistor 237; silicone control rectifier 238; condenser 240; diode 242; condenser 243; and transformer 244.

The parts illustrated and enumerated in connection with FIG. 4 of the drawings must be selected to have proper values so that an alternating current value between conductors 190 and 212 is converted into a pulsing, high voltage current in the order of 20,000 volts delivered to high voltage wire 222 which is wrapped around the tube of xenon lamp 152.

SUMMARY

It will now be obvious that I have provided a vehicle-responsive signal system that comprises a first, vehicle-responsive detector means 6 which is disposed in operative relation to the lane 2 of a roadway. While in FIG. 1 of the drawings, I have shown a single lane 2, obviously, a roadway comprising a plurality of lanes can have each lane similarly equipped to that shown. A second, vehicle-responsive detector means 8 is disposed in operative relation on said lane 2 and is spaced in the direction of vehicular traffic in said lane 2 from detector means 6 a predetermined distance. Preferably, the detector means 6 and 8 comprise loop detectors which are embedded in the roadway or road bed of lane 2 and with the detector means 6 and 8 identical and spaced apart a precise distance so that a vehicle traveling over said detector means can travel a precise distance and the speed of such vehicle determined because of the time which it takes for such vehicle to travel a precise distance.

Next, I have provided electrical circuitry which is responsive to actuation of loop detectors 6 and 8 by the proximity of a vehicle 4 in respect to each thereof. Thus, I have provided a first, detector-responsive switch means 40 coupled with said first loop detector 6 and a second, detector-responsive switch means 106 coupled with said second detector 8. A first, electrically operated, vehicle timer 80 is provided and which timer has a predetermined time cycle and a first timer normally open, switch blade means 88 movable to closed position, for its timed cycle period, upon energizing of said first timer 80. A second electrically operable switch means 60, having normally closed switch blade means 66 movable to open position after a predetermined time delay upon energizing of said second switch means 60, are utilized in the electrical circuitry to energize said first timer 80. A first electrical circuit comprises, as novel elements thereof, said first switch means 40 and said second electrical switch means 60, whereby upon energizing of said first electrical circuit, said normally closed switch blade means 66 of said second electrical switch means 60 will move, after time delay, to open position. Tracing said first electrial circuit, the details are: source 42, conductor 44, closed first detector-responsive switch means 40, conductor 54, second switch means 60, conductor 58, conductor 62, conductors 50 and 51 to source 42.

A first electrical relay 84, having normally open switch blade means 94 and 96 and which switch blade means close upon energizing of relay 84, is provided. A second electric circuit comprises as novel elements, said switch blade means 66, when closed, of said second electrically operable switch means 60, and said first vehicle timer means 80, whereby said first circuit is controlled by the operation of said first switch means 40, and said second circuit to said vehicle timer 80 may move to closed position only when said switch blade means 66 of said second electrically operable switch means 60 is in its normally closed position. Tracing said second circuit, the details are: source 42, conductor 44, conductor 68, now closed switch blade 64 of switch 56, conductor 70, now closed switch blade 66 of second electrical switch means 60, conductor 72, now closed switch blade 74 of switch means 76, conductor 77, conductor 78, first timer 80, conductor 82, conductor 62, and conductors 50 and 51 to source 42.

A first vehicle timer holding circuit for maintaining said first timer 80 energized comprises, as novel elements thereof, said switch blade means 94, when closed, of said first electric relay 84, and said switch blade means 88 of said first vehicle timer 80. Tracing said first timer holding circuit, the details are: source 42, conductors 44, 68, and 100, switch blade means 94, conductors 98 and 83, first relay 84, conductor 86, now closed switch blade means 88 of first timer 80, and conductors 90, 62, 50, and 51 to source 42.

A second relay holding circuit for maintaining said first electrical relay 84 energized, comprises: as novel elements: said switch blade means 88 of said first vehicle timer 80, the first electrical relay 84, and the switch blade means 94 of said first relay 84, whereby said first vehicle timer 80, after being energized, will remain energized until its switch blade means 88 opens. Tracing said second relay holding circuit, the details are: source 42, conductors 44, 68, and 100, switch blade means 94 of first relay 84, conductors 98 and 83, first relay 84, conductor 86, now closed switch blade means 88 of first timer 80, and conductors 90, 62, 50, and 51 to source 42.

A third and signal operating circuit includes therein, as novel elements, switch blade means 96 of said first electrical relay 84 and other switch means 104 closing in response to the closing of said second detector switch means 106. Tracing said third and signal operating circuit, the details are: source 42, conductors 44, 68, and 100, switch blade means 96 of said first electrical relay 84, conductor 102, other switch means 104 of relay 112 (now closed as second detector switch means 106 closed in response to the circuit actuated by reason of the actuation of second loop detector 8, switch 22, relay 32, and switch 106 which results in the energizing of relay 112 and the closing of switch 104), conductors 113 and 116, second electrically operable and constant impulse providing timer 118, conductor 120, now and normally closed switch blade means 122 of second timer 118, and conductors 124, 50, and 51 to source 42.

Thus, the second and constant impulse providing timer 118 is energized if the second detector-responsive switch blade means 106 is closed in response to a reaction from the second loop detector 8 if at that time period the first vehicle timer 80 has not yet timed out and the switch means 96 has not yet opened in response to the timing out of the first timer 80.

The electrical circuit to electrically control signal lamp 152 operates in response to the providing of a signal of suitable length provided by second and constant impulse providing timer 118. As a vehicle could actuate second loop detector 8 in a fraction of second before timer 80 times out and thus provide a signal of very short and unusable duration when first timer 80 and switch blade means 104 are both operated simultaneously, the second and constant impulse providing timer 118 is operated for the desired and useful period regardless of the length of the signal causing the initial energizing of said second timer 118. By having a signal of desired length from the second timer 118, then a thrid and signal duration timer 162 will always operate, when it should, as it will always have a signal of desirable length of time duration to cause its operation. Also, third and signal duration timer 162 can have a preset time cycle so that signal means, as lamp 152, will operate for the preset time period of the third timer 162.

In combination with the detailed circuitry and parts previously described, there is provided a third electrically operable switch means 56 which has normal open switch blade means 64 which is movable to close position upon energizing of the third switch means 56. Where such third switch blade means 64 is coupled in the previously designated first circuit and the third switch means 56 and the second electrical switch means 60 are disposed in parallel relation with each other and in series with the first switch means 40 and wherein the electrically operable switch means 56 is coupled in the previously described second circuit, the second electrical circuit can be initially completed only when the normally open switch blade means 64 of the third electrical switch means 56 is in closed position. Tracing the circuitry just described, the details are: source 42, conductor 44, now closed switch 40, conductor 54, through third electrical switch 56, and said second electrical switch 60 in parallel, and conductors 58, 62, 50, and 51 to source 42. Thus, the second electric circuit (comprising source 42, conductors 44 and 68, switch blade 64, conductor 70, switch blade 66 of switch 60, conductor 72, switch blade 74 of switch 76, conductors 77 and 78, first timer 80, conductors 82, 62, 50, and 51 to source 42) can be initially completed only when said normally open switch blade means 64 of said third, electrically operable switch means 56 is in closed position.

A second electrically operable constant impulse providing timer 118 having a predetermined time cycle and having a second timer, normally open, switch blade means 122 is coupled in the third electrical circuit and provides a predetermined time operating cycle therefor. The details of said third electrical circuit are, briefly: source 42, conductors 44, 68, and 100, switch blade 96, conductor 102, switch means 104, conductors 113 and 116, timer 118, conductor 120, switch blade 122, and conductors 124, 50, and 51 to source 42. This third electrical circuit is held until the timer 118 times out after its preset time cycle and switch means 122 of timer 118 opens as timer 118 times out.

In the combination of the preceding paragraph, preferably, a second electrical relay 128, having switch blade 132, is coupled in said third electrical circuit there described. Also, a third holding circuit for maintaining said second timer 118 energized is employed and comprises as novel elements, switch blade means 132 of said second relay 128, said second timer 118, and the switch blade means 122 of the second timer 118.

The details of said third holding circuit are: source 42, conductors 44, 68, and 138, switch blade means 132 of second electrical relay 128, conductors 131 and 116, second timer 118, conductor 120, switch blade means 122 of second timer 118, and conductors 124, 50, and 51 to source 42.

In combination with the third holding circuit of the previous paragraph, there is preferably provided a fourth holding circuit. This fourth holding circuit comprises as novel elements: switch blade means 132 of said second realy 128, said second relay 128, and the switch blade means 122 of the second timer 118. The details of the fourth holding circuit are: source 42, conductors 44, 68, and 138, switch blade means 132 of said second relay 128, conductors 131, 116, and 126, second electrical relay 128, conductor 130, switch blade means 122 of second timer 118, and conductors 124, 50, and 51 to source 42.

In combination with the fourth holding circuitry of the previous paragraph, there is preferably provided a third, electrically operable signal duration timer 162. This third timer 162 has a predetermined time cycle and normally open switch blade means 160. The second relay 128 is provided with additional switch blade means 134 which move to closed position upon energizing of the second relay 128. A fourth holding circuit for maintaining said third timer 162 energized comprises as novel elements: said switch blade means 160 of said third timer 162 as well as said third timer 162. Assuming that conductor 154 has been energized from source 42 through the various circuitry heretofore described from source 42 (conductor 158 is always energized), then third, signal duration timer 162 will be energized and its switch blades 160 will be in closed position. Tracing the fourth holding circuit to maintain said third, signal duration timer 162 energized after it has once been energized, the details are: from conductor 158, through now closed switch blade 160 of third, signal duration timer 162, conductor 164, relay 168, and conductor 170, to assumed energized conductor 154.

Obviously, changes may be made in the dimensions, and arrangement of the parts of my invention without departing from the principles thereof, the above setting forth only preferred forms of embodiment of my invention.

I claim:

1. A vehicle-responsive signal system comprising a first, vehicle-responsive detector disposed in operative relation to a lane of a roadway and a first detector-responsive switch means coupled with said first detector; a second, vehicle-responsive detector disposed in operative relation to said lane of a roadway, positioned in measured, spaced relation to said first detector, spaced in the direction of travel of vehicular traffic in said lane of a roadway, and a second, detector-responsive switch means coupled with said second detector; a first, electrically operated timer having a predetermined time cycle and having a first timer normally open, switch blade means movable to closed position, for its timed cycle period, upon energizing of said first timer; a second, electrically operable switch means having normally closed switch blade means movable to open position, after a predetermined time delay, upon energizing of said second switch means; a first electrical circuit comprising said first switch means, and said second electrical switch means, whereby upon energizing of said first circuit said normally closed switch blade means of said second electrical switch means will move, after time delay, to open position; a first electrical relay having normally open switch blade means; a second electrical circuit comprising said switch blade means, when closed, of said second electrical switch means, and said first timer, whereby said first circuit is controlled by the operation of said first switch means, and said second circuit to said timer may move to closed position only when said switch blade means of said second switch means is in its normally closed position; a first holding circuit for maintaining said first timer energized, comprising switch blade means, when closed, of said electric relay, and said switch blade means of said first timer; a second holding circuit for maintaining said electrical relay energized comprising said switch blade means of said first timer, the electrical relay, and the switch blade means of said electrical relay, whereby said first timer, after being energized, will remain energized until its switch blade means opens; a third electrical circuit including therein switch means closing in response to closing of said first timer switch means and other switch means closing in response to closing of said second detector switch means; and an electrically controlled signal means responsive to the operation of said third electrical circuit.

2. The combination of claim 1 with a third, electrically operable switch means having a normal open switch blade means movable to closed position upon energizing of said third switch means, wherein said third switch blade means is coupled in said first circuit, and said third electrical switch means and said second electrical switch means are disposed in parallel with each other and in series with said first switch means, and wherein said switch blade means of said third, electrically operable switch means is coupled in said second circuit, whereby said second electrical circuit can be completed only when said normally open switch blade means of said third, electrically operable switch means is in closed position.

3. The combination of claim 1, wherein a second, electrically operable timer having a predetermined time cycle and having a second timer, normally open, switch blade means is coupled in said third circuit providing a time operating period for said third electrical circuit.

4. The combination of claim 3 and a second electrical relay having switch blade means and which second relay is coupled in said third electrical circuit, and a third holding circuit for maintaining said second timer energized comprising said switch blade means of said second relay, said second timer, and the switch blade means of the second timer.

5. The combination of claim 4 and a fourth holding circuit for maintaining said second relay energized comprising said switch blade means of said second relay, said second relay, and the switch blade means of the second timer.

6. The combination of claim 4 and a third electrically operable timer having a predetermined time cycle and having a third timer, normally open switch blade means; additional switch blade means of said second relay moved to closed position upon energizing of said second relay; and a fourth holding circuit for maintaining said third timer energized comprising said switch blade means of said third timer and said third timer.

* * * * *